Jan. 11, 1938.   A. O. McCOLLUM   2,104,950
IRONING MACHINE
Filed March 1, 1934   11 Sheets-Sheet 4
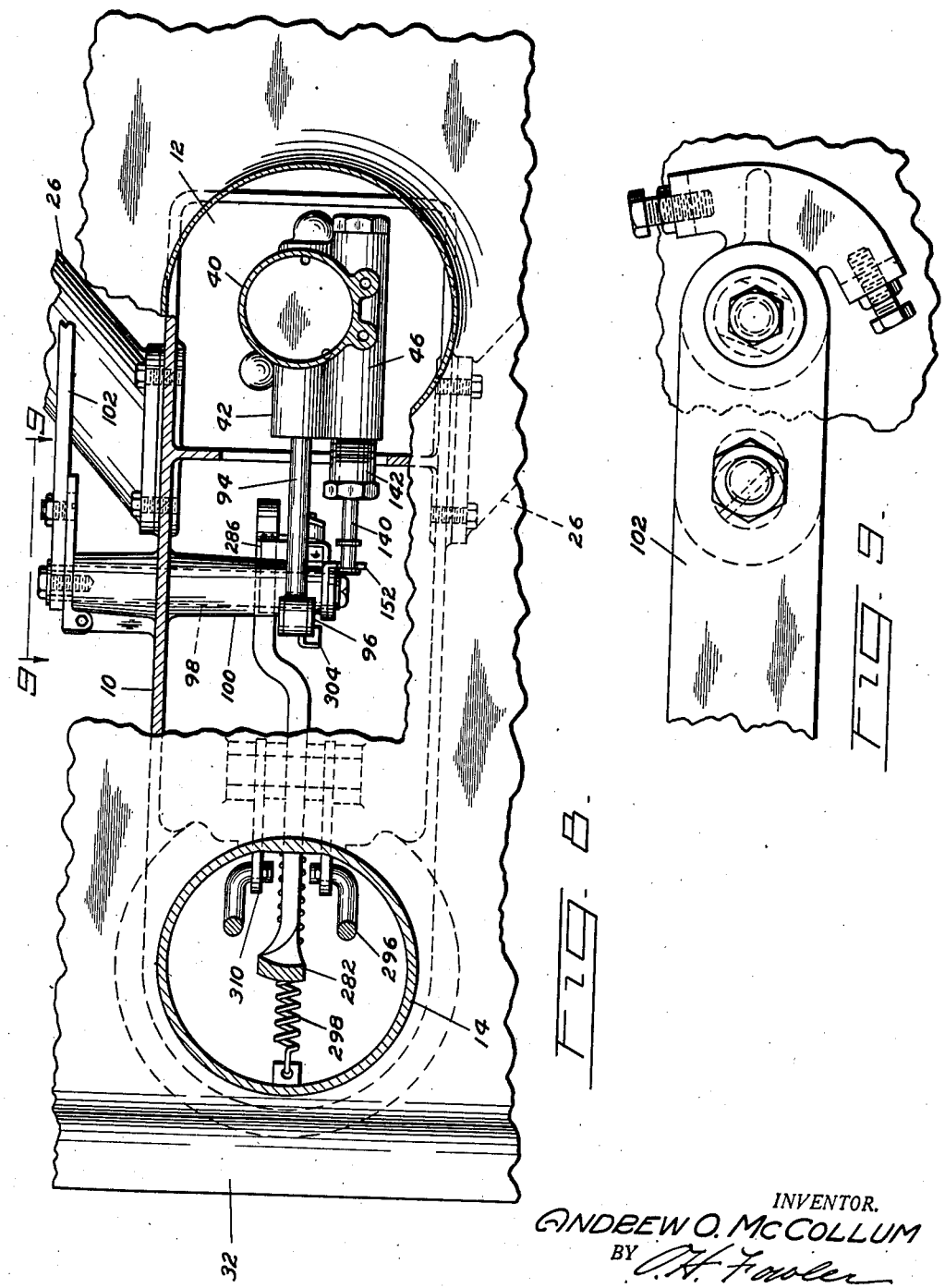
INVENTOR.
ANDREW O. McCOLLUM
BY
ATTORNEY

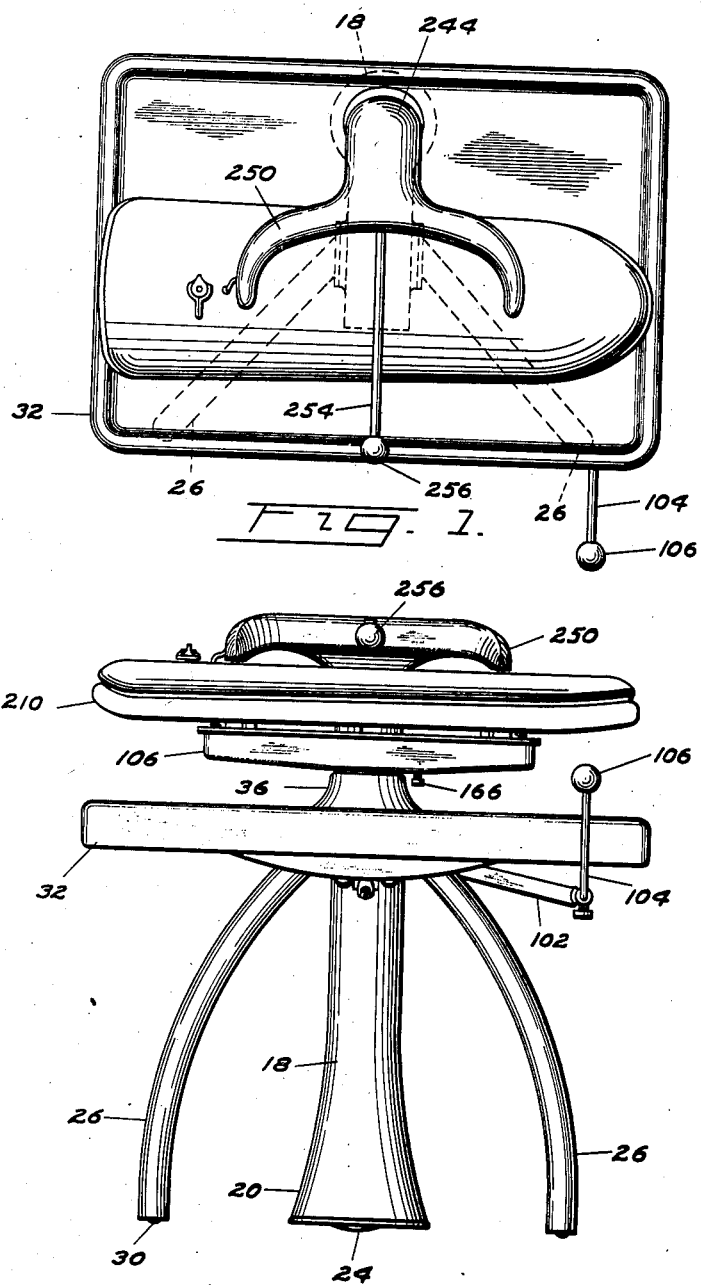

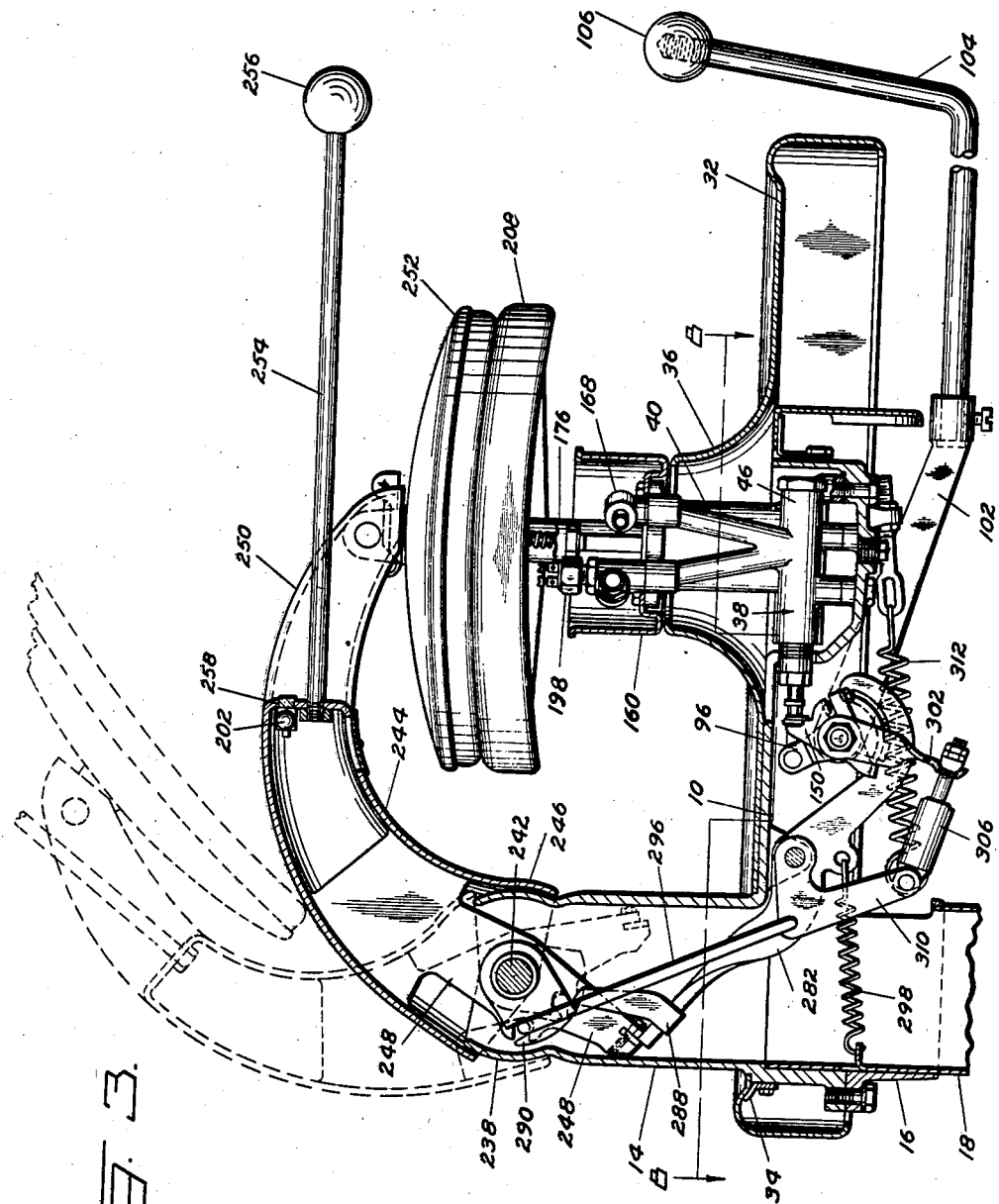

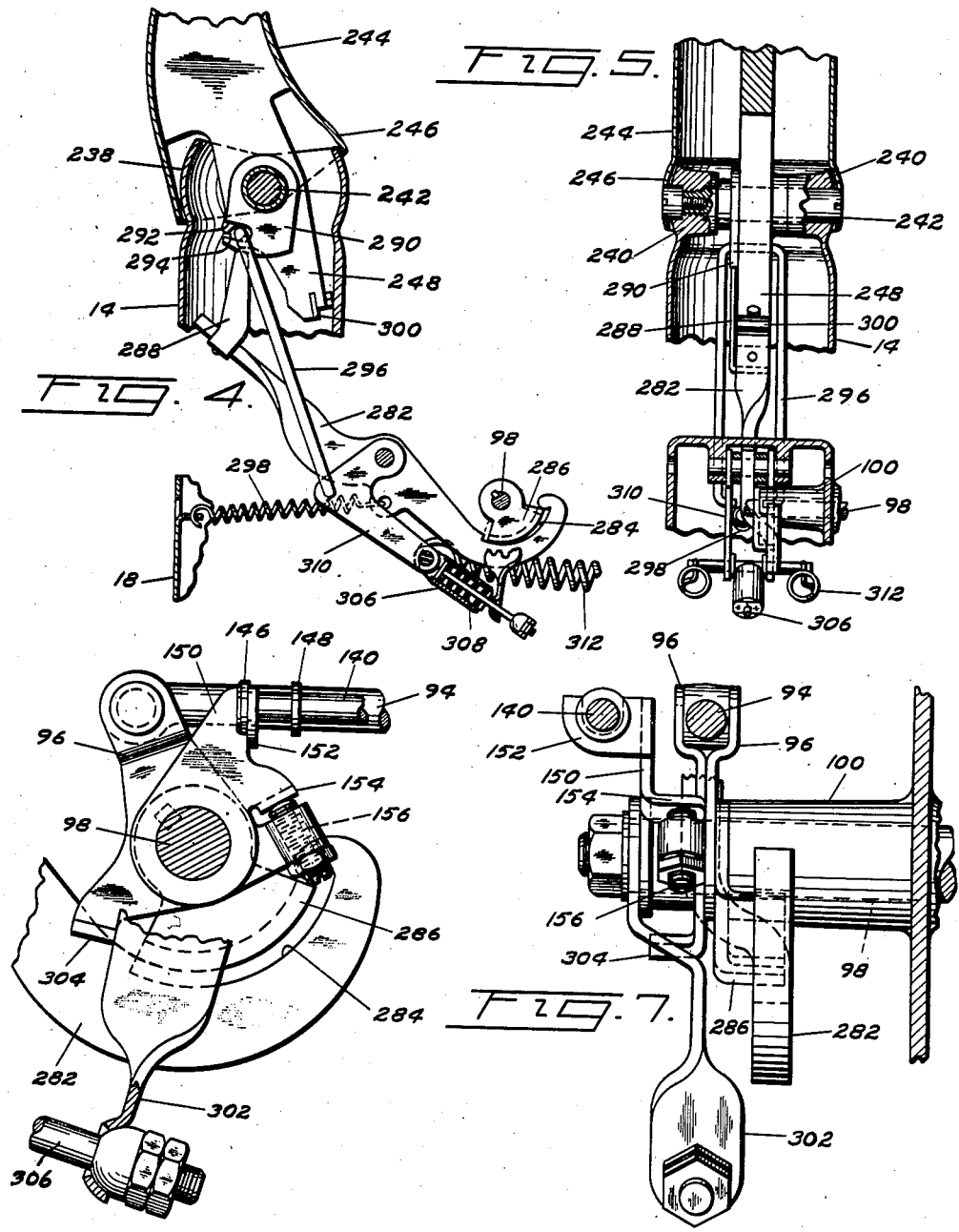

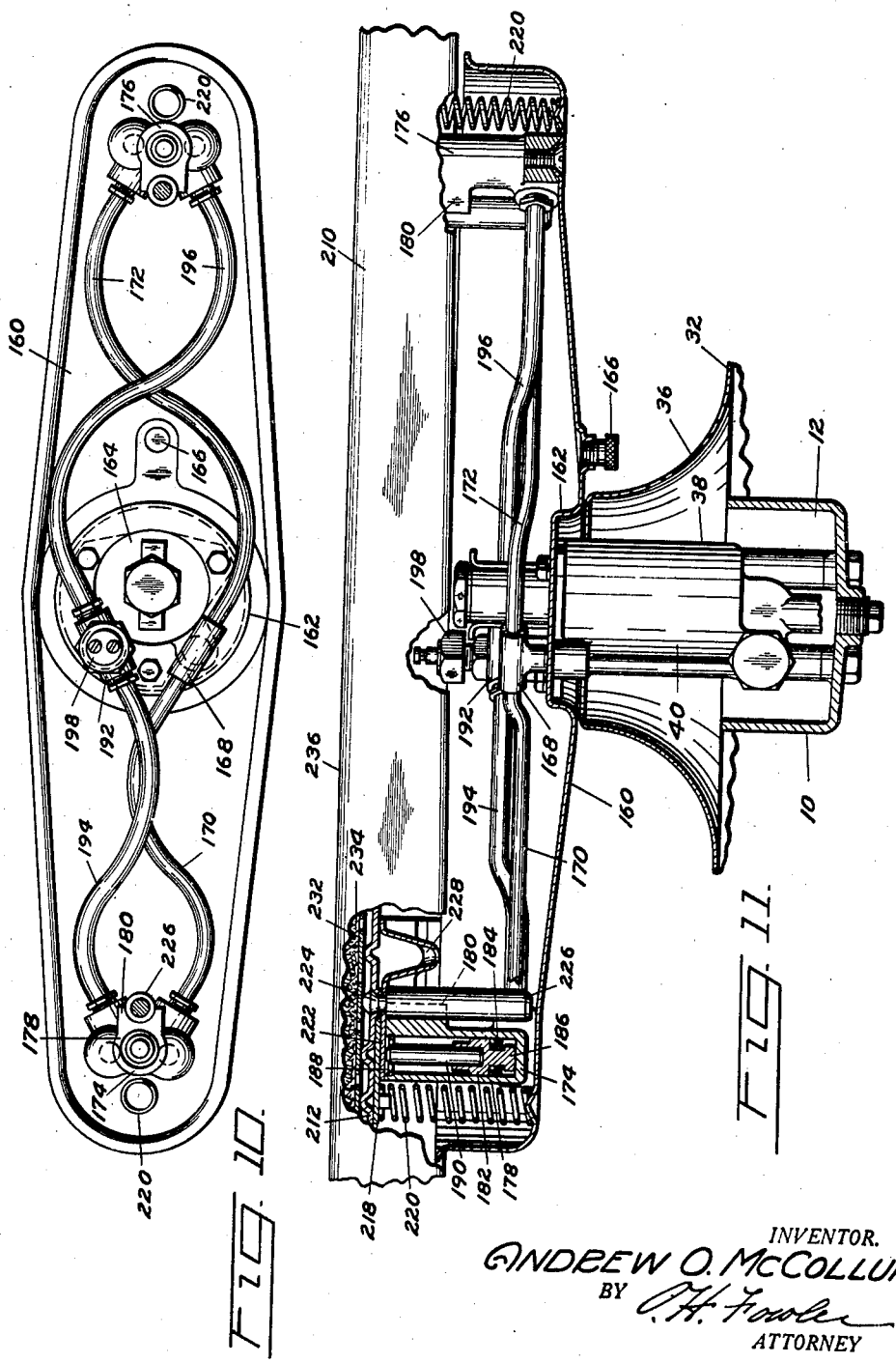

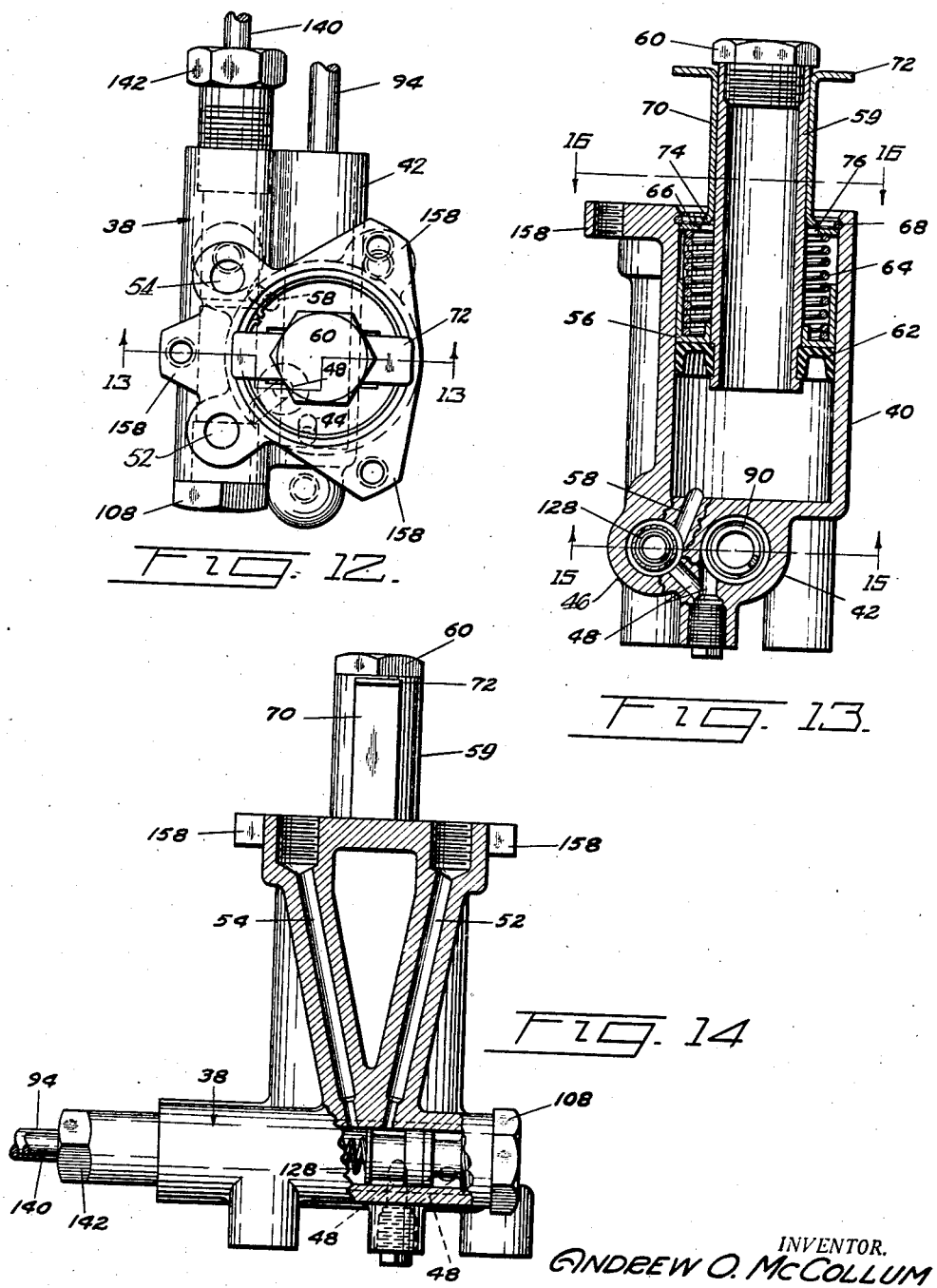

Jan. 11, 1938.     A. O. McCOLLUM     2,104,950
IRONING MACHINE
Filed March 1, 1934     11 Sheets-Sheet 7

INVENTOR.
ANDREW O. McCOLLUM
BY C. H. Fowler
ATTORNEY

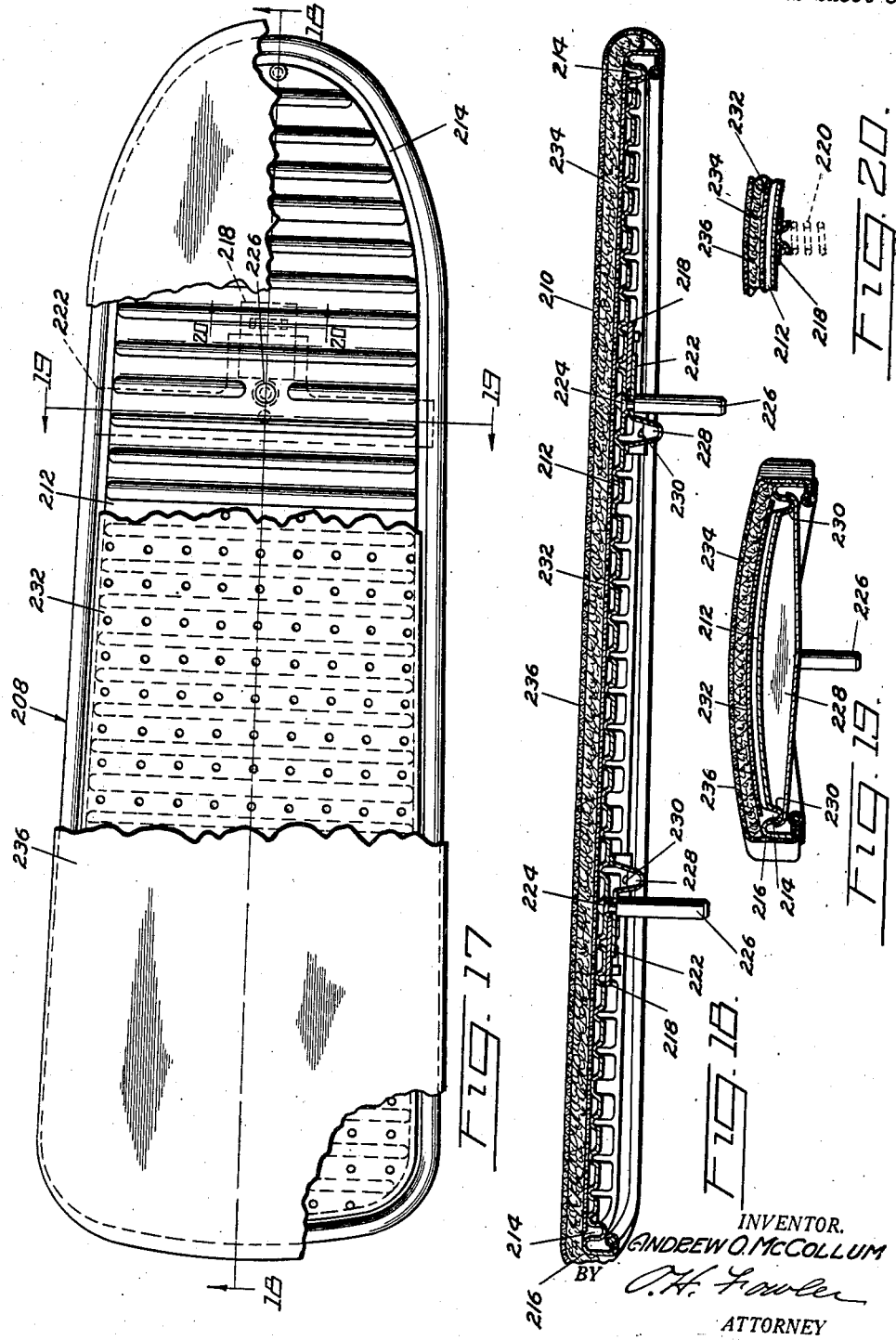

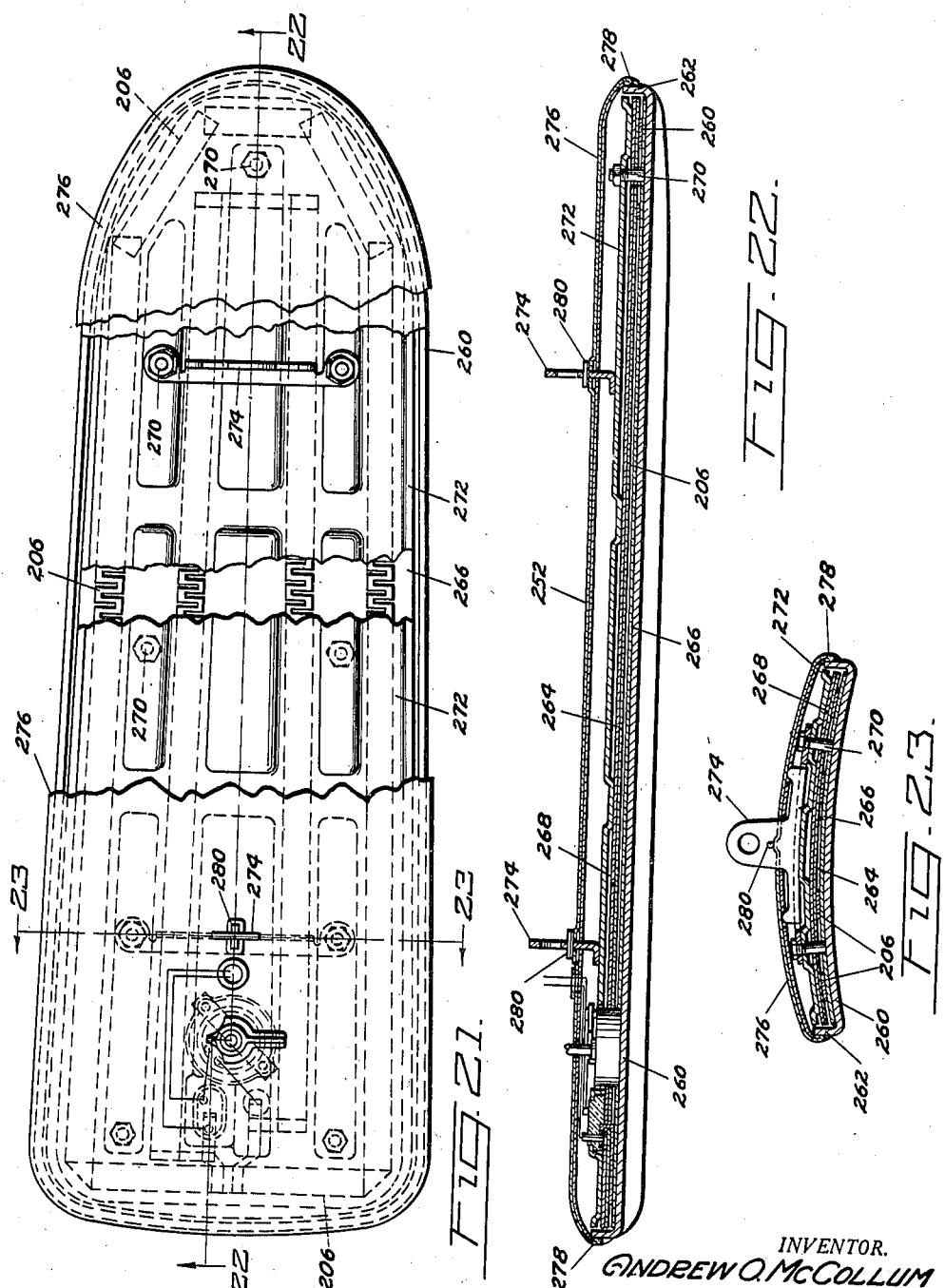

Jan. 11, 1938.  A. O. McCOLLUM  2,104,950
IRONING MACHINE
Filed March 1, 1934    11 Sheets-Sheet 10
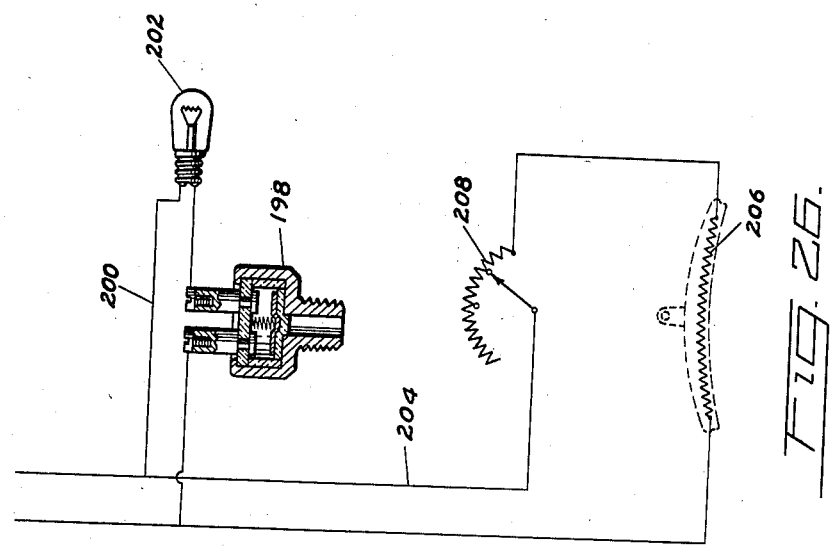
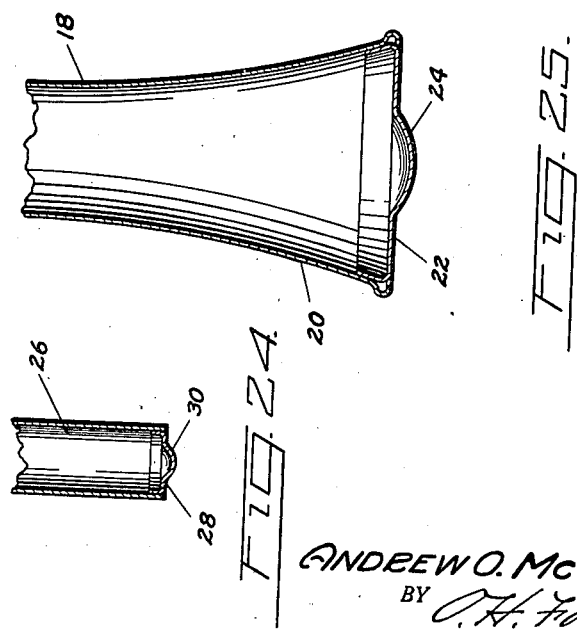
INVENTOR.
ANDREW O. McCOLLUM
BY O. H. Fowler
ATTORNEY.

Jan. 11, 1938.　　　A. O. McCOLLUM　　　2,104,950
IRONING MACHINE
Filed March 1, 1934　　11 Sheets-Sheet 11
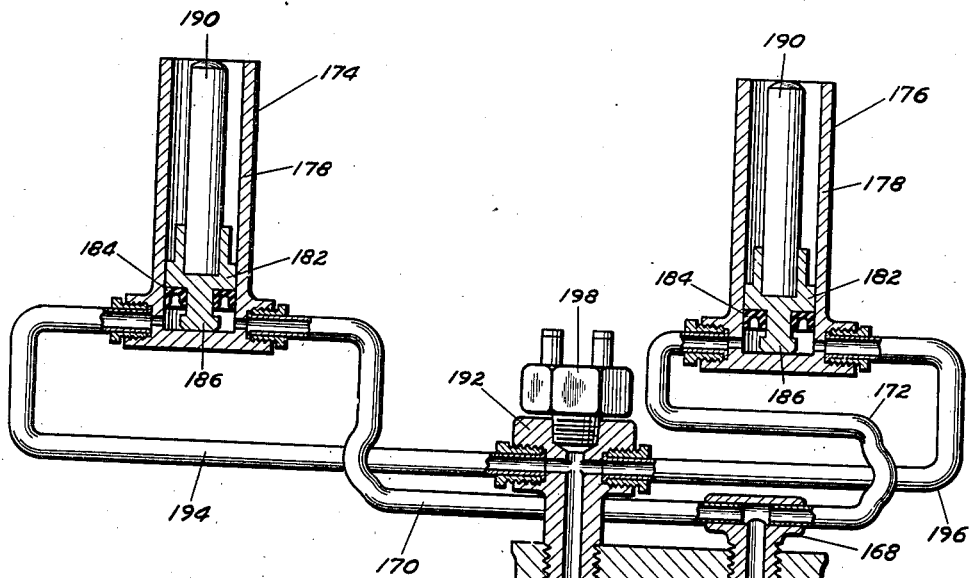
Fig. 27.
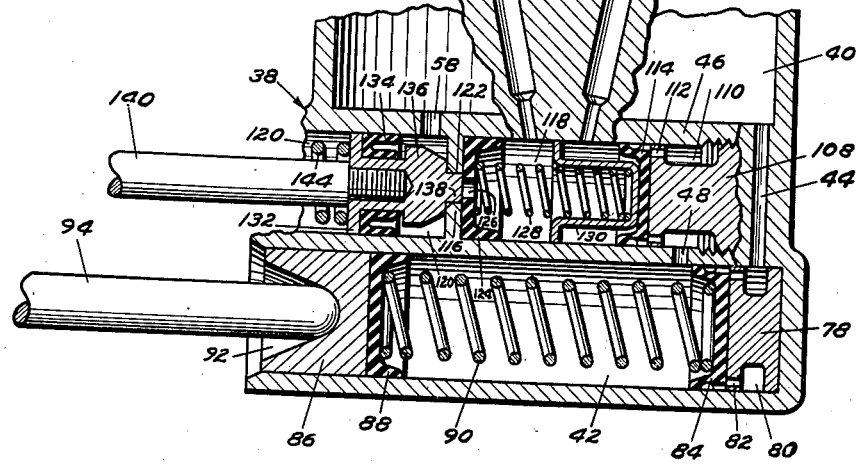
INVENTOR
ANDREW O. McCOLLUM
BY O. H. Fowler
ATTORNEY Patented Jan. 11, 1938

2,104,950

UNITED STATES PATENT OFFICE 2,104,950

IRONING MACHINE

Andrew O. McCollum, Detroit, Mich., assignor to Hydraulic Brake Company, Detroit, Mich., a corporation of California Application March 1, 1934, Serial No. 713,596

18 Claims. (Cl. 38—25)

This invention relates to ironing machines, and more particularly to ironing machines for domestic use.

Broadly the invention comprehends an ironing machine including relatively movable ironing elements, and hydraulic means for actuating one of the ironing elements to create an ironing pressure between the elements.

An object of the invention is to provide an ironing machine for ironing or pressing textiles or garments including a power-actuated means capable of producing a relatively high pressure with a minimum effort on the part of the operator.

Another object of the invention is to provide an ironing machine including a pair of relatively movable ironing elements, one manually movable into operative position, and the other actuated by hydraulic means capable of delivering high pressure so as to provide a better finish to the work.

Another object of the invention is to provide an ironing machine including relatively movable ironing elements, one of the elements being yieldingly supported to compensate for variations in the thickness of the work.

Another object of the invention is to provide an ironing machine including relatively movable ironing elements one yieldingly supported and the other movable manually into operative position, which movement displaces the yieldingly supported element proportionately to the thickness of the work, and hydraulic means for moving the yieldingly supported element to create an ironing pressure between the elements.

Yet a further object of the invention is to provide an ironing machine including relatively movable ironing elements, manual means for moving one of the elements into operative position, hydraulic means for actuating the other element to create an ironing pressure between the elements, means for locking the manually movable elements in operative position, and means for tripping the locking means upon release of pressure in the hydraulic actuating means.

Other objects and advantages of the invention will more fully appear from the following description taken in connection with the accompanying drawings forming a part of this specification, and in which,—

Figure 1 is a top plan view of an ironing machine embodying the invention;

Figure 2 is a front elevation of the ironing machine illustrated in Figure 1;

Figure 3 is a cross-sectional view, partly broken away and partly in elevation, illustrating the head in operative position in full lines, and in elevated position in dotted lines;

Figure 4 is a fragmentary view of the support for the head of the machine including the column, the arm supporting the head, and linkage for actuating the arm;

Figure 5 is a fragmentary view of the support for the head including the column, the arm and the linkage for actuating the arm;

Figure 6 is an enlarged detail view of cooperating parts for actuation of the head.

Figure 7 is a similar view turned through an angle of ninety degrees;

Figure 8 is a sectional view taken substantially on line 8—8, Figure 3;

Figure 9 is a fragmentary view substantially on line 9—9, Figure 8;

Figure 10 is a top plan view of the buck support including a receptacle housing the fluid pressure actuated motors and conduits connected to the motors;

Figure 11 is a longitudinal sectional view of the buck support illustrating the buck positioned thereon with parts broken away;

Figure 12 is a top plan view of the operating unit for the buck;

Figure 13 is a sectional view substantially on line 13—13, Figure 12.

Figure 14 is a side elevation of the operating unit partly in section.

Figure 17 is a top plan view of the buck partly broken away;

Figure 18 is a longitudinal sectional view of the buck substantially on line 18—18, Figure 17;

Figure 19 is a sectional view substantially on line 19—19, Figure 17;

Figure 20 is a fragmentary view of the buck substantially on line 20—20, Figure 17;

Figure 21 is a top plan view of the head partly broken away to illustrate the heating element;

Figure 22 is a longitudinal sectional view substantially on line 22—22, Figure 21;

Figure 23 is a cross-sectional view substantially on line 23—23, Figure 21;

Figure 24 is a fragmentary view of one of the supports for the machine;

Figure 25 is a fragmentary view of the main support or column for the machine,

Figure 26 is a diagrammatical illustration of the electrical circuit, and

Figure 27 is a diagrammatical illustration of the fluid pressure system.

Figure 15:
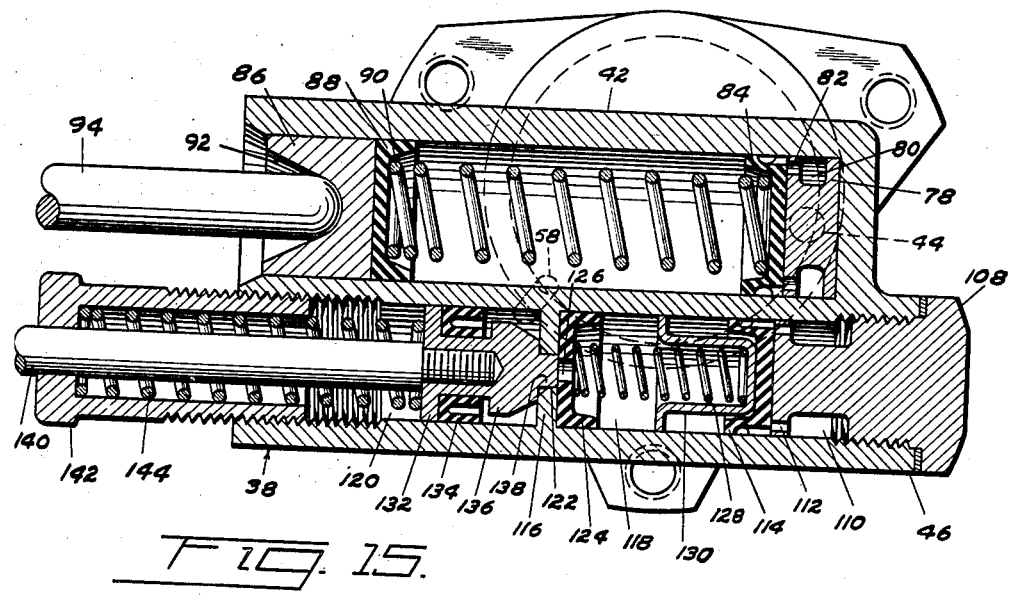
Figure 15 is an enlarged sectional view substantially on line 15—15, Figure 13.
Figure 16:
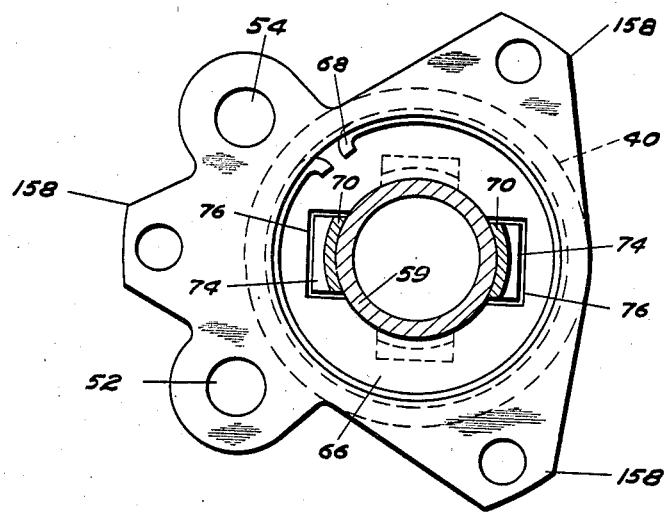
Figure 16 is a cross-sectional view substantially on line 16—16, Figure 13.

Referring to the drawings for more specific details of the invention, 10 represents a rectangular casting constituting a frame. Arranged at one end of the frame is a sump 12, and at the other end a hollow vertical column 14. A sleeve 16, suitably secured to the frame concentrically to the column 14, receives the upper end of a column 18, the base of which is flared as indicated at 20, and fitted into the base is a closure plate 22 swedged outwardly to provide a semi-spherical bearing 24. Corresponding hollow legs 26, preferably tubular, are suitably secured to the respective sides of the frame 10, and fitted in the base of each leg is a closure plate or cap 28 swedged to provide a semi-spherical bearing 30. The legs 26 provide, in conjunction with the column 18, a tripod supporting the frame 10, and a table top 32 is secured to the frame as by lugs 34. This top has an opening receiving the column 14 and an upwardly extending frusto-conical portion 36 arranged concentrically to the pan 12.

The pan 12 has suitably mounted therein an operating unit indicated generally at 38. This unit comprises a casting including a reservoir 40, a cylinder 42 having a port 44 providing a communication between the cylinder and the reservoir and a discharge port, and a valve chamber 46 arranged in parallel relation to the cylinder. The valve chamber is connected by a passage 48 to the discharge port of cylinder 42, and a port 58 in the valve chamber provides a communication between the chamber and the reservoir. The valve chamber is also connected to an outlet passage 52 and to a return passage 54 formed in bosses or ribs on the wall of the reservoir.

The reservoir 40 has therein a piston 56 having a concentrically disposed opening in which is fitted a hollow piston rod 59 closed at its outer end as by a plug 60. This plug is removable so that the reservoir may be filled through the rod. The inner end of the rod extends beyond the face of the piston and a leak-proof cup 62 on the face of the piston is secured against displacement by its inner periphery confined in a circumferential slot on the rod.

A spring 64 is sleeved on the piston rod between the head of the piston and a ring 66 also sleeved on the rod. The ring 66 is fitted snugly in the cylinder 40 and is secured against displacement by a transversely split ring 68 fitted in a circumferential groove in the wall of the cylinder. The piston 56 is urged by the spring 64 to impose pressure on the fluid in the reservoir. Suitably secured to the piston rod 59 are oppositely disposed straps 70, the upper ends of which are bent outwardly to provide finger grips 72, and the lower ends are bent to provide stops 74 adapted to pass freely through openings 76 in the inner periphery of the ring 66. When it is desired to fill the reservoir, the piston may be retracted to relieve pressure in the reservoir 40 by exerting a pull on the finger grips, and the piston may be retained in retracted position by rotating the piston and its rod so that the stop 74 engages the ring 66.

The cylinder 42 has therein a disk 78 seated on the head of the cylinder. This disk has a circumferential groove 80 communicating with the intake port 44, and a plurality of openings 82 providing communications between the groove 80 and the cylinder 42, and seated on the disk is a collapsible leak-proof cup 84. A reciprocable piston 86 in the cylinder 42 has on its head a leak-proof cup 88, and a spring 90 interposed between the cups 84 and 88 serves to retain the cups against displacement and to return the piston to its retracted position.

The piston 86 has formed in its back a recess 92 for the reception of one end of a thrust rod 94, the other end of which is pivotally connected to an arm 96 suitably secured to a shaft 98 journaled in a bearing 100 on the frame. An operating lever 102 is secured to the shaft and adjustably secured to the free end of this lever is an extension 104 having attached thereto a knob or handle 106. By actuating the lever the shaft may be rotated to move the arm 96 through an angle and this force is transmitted through the thrust rod 94 to the piston 86.

The valve chamber 46 has one end closed by a plug 108 having a circumferential groove 110 communicating with the passage 48 connecting the valve chamber 46 to the discharge port of the cylinder 42, and a plurality of openings 112 providing communications between the groove 110 and the valve chamber, and seated on the plug 108 is a collapsible leak-proof cup 114. The valve chamber 46 has a diaphragm 116 dividing the chamber into two compartments 118 and 120, and the diaphragm has an opening 122 providing a communication between the compartments. Seated on the diaphragm in the compartment 118 is a cup 124 having an opening 126 of smaller diameter than the diameter of the opening in the diaphragm so that the inner periphery of the cup overhangs the opening. The cup 124 is held against displacement by a spring 128 interposed between the cup and a thimble 130 snugly fitted in the chamber, and seated concentrically on the collapsible leak-proof cup 114. The thimble 130 has a flange slidably engaging the wall of the chamber 118 between the outlet passage 52 and the return passage 54 so as to divide the chamber and thus provide means for circulating the fluid in the system to the end that the fluid may move from the reservoir through the system and back to the reservoir so that any air or gas bubbles in the fluid may be transmitted to the reservoir and collected in the hollow stem 59 of the piston 56.

The compartment 120 has therein a valve 132. The head of this valve has thereon a leak-proof cup 134 and a frustro-conical extension 136 capped by a cylindrical portion 138 adapted to enter the opening in the diaphragm and to engage the overhanging periphery of the cup 124 defining the opening 126 in the cup. A rod 140 suitably connected to the valve extends through a packing box 142 threaded in the chamber 46 and a spring 144 is sleeved on the rod between the valve 132 and the head of the box. The rod 140 has thereon collars 146 and 148, and a lever 150 loosely mounted on the shaft 98 has an arm 152 embracing the rod between the collars, and the lever has an offset portion 154 adaptable for engagement by an adjustable screw 156 carried by the lever 96.

The operating unit 38 has a plurality of flanges 158 to which a buck support 160 is suitably secured. This support comprises an elongated receptacle having its rim rolled to lend strength and rigidity to the structure. The bottom of the receptacle is swedged inwardly to provide a circular raised portion 162 for the reception of the upper end of the operating unit 38, and the raised portion has an opening 164 through which the rod 59 of the piston 56 extends, and suitably located in the bottom of the receptacle, preferably adjacent to the raised portion 162, is a drain opening closed as by a plug 166. Because of the swedged portion 162, the receptacle 160 is lowered so that the bottom thereof is substantially touching the frustro-conical portion 36 on the table 32, thus presenting an exceedingly neat finish.

A T 168 is connected to the passage 52, and pipe lines 170 and 172 connected to this T are connected respectively to motor cylinders 174 and 176, suitably mounted in the opposite ends of the receptacle. Each of the motor cylinders includes a cylinder 178, having a guide 180 formed parallel thereto and a reciprocable piston 182 in the cylinder having on its head a leak-proof cup 184 and a projection 186 having a shoulder retaining the cup against displacement. The projection also serves to retain the piston in spaced relation to the head of the cylinder so that fluid upon entering the cylinder may be received on the head of the piston. The piston is retained in the cylinder by a transversely split ring 188 seated in a circumferential groove in the wall of the cylinder, and suitably secured to the back of the piston is a pin 190, the free end of which is at the extreme upper end of the cylinder when the piston is in fully retracted position.

A cross fitting 192 is connected in the passage 54, and pipe lines 194 and 196 connected to this fitting are connected respectively to the cylinders 174 and 176. These pipe lines are preferably of larger diameter than the pipe lines 170 and 172 so that friction may be reduced to a minimum. The fitting 192 has connected thereto a fluid pressure valve 198 connected in a circuit 200 including a lamp 202. The circuit 200 is tapped off of a circuit 204 including a heating element 206 and a rheostat 208, it of course being understood that the circuit 204 may be connected to any suitable source of electrical supply.

A buck 210 is positioned on the buck support. This buck includes a convex, transversely corrugated plate 212 having its periphery rolled to provide a continuous groove 214 adjacent the periphery and a flange 216 extending above and below the top of the corrugated portion of the plate. Secured on the bottom of the plate are bearing plates 218 having stamped therefrom clips for attaching springs 220 interposed between the bearing plates and the bottom of the receptacle 160.

Plates 222 are flapped against the bearing plates 218 and are secured in position by rivets 224 formed on the corresponding ends of pins 226. These pins are received by the guides 180 on the motor cylinders. The plates 222 have formed therewith troughs 228 communicating with the continuous groove 214 in the plate 212 by way of openings 230, and serve to convey condensate collected in the groove 214 to the receptacle 160, from which the condensate may be drained through the opening in the bottom of the receptacle. A perforated plate 232 is suitably secured on the face of the corrugated plate 212. The margin of this perforated plate overhangs the groove 214, and a felt pad 234 spread on the perforated plate is retained in position by a fabric covering 236, suitably secured back of the lower edge of the flange 216 of the buck. The buck 210 is not claimed in the present application as it forms the subject matter of my divisional application Serial No. 2,287, filed January 17, 1935.

The column 14 has a semi-spherical portion 238 in which is formed oppositely disposed bosses 240, bored to receive a pivot pin 242. A hollow arm 244 has a semi-spherical portion 246 receiving the semi-spherical portion 238 on the column, and a centrally located web or extension 248 transversely bored for the reception of the pivot pin 242. The upper end of the arm 244 terminates in corresponding oppositely disposed horns 250 to which is suitably attached a head 252 adaptable for cooperation with the bulk 210. A handle for lowering the head into operative position is attached to the arm 244 centrally between the horns. This handle includes a rod 254 and a hand grip or knob 256, and arranged in the arm 244 immediately above the handle is a window 258 having therein a colored glass through which the light rays from a lamp 202 connected in the circuit 200 may be observed.

The head 252 includes a plate 260 having a profile corresponding to the ironing face of the buck 210. The periphery of the plate 260 is flanged as shown at 262 and positioned on the back of the plate in spaced relation to the flange is a heating unit comprising the heating element 206 arranged between corresponding sheets of mica 264 and 266. The heating unit is covered by a sheet of asbestos 268, and arranged on the back of the plate are studs 270 extending upwardly through openings in the heating unit and asbestos. A compression plate 272 positioned on the asbestos has thereon spaced straps 274, and the compression plate and straps are clamped in position by the studs 270. The straps 274 extend upwardly through openings in a cover plate 276 having a flange 278 embracing the flange 262 on the plate 260, and the cover plate is suitably secured in position as by pins 280 extending transversely through the straps 274, and the straps are provided with apertures for attachment to the horns.

A lever 282 pivoted on the frame has in one end a notch 284 for the reception of a segment 286 keyed to the shaft 98, and the other end of the lever 282 extends into the column 14, and has secured thereto a lateral arm 288 adapted to ride on a segment 290 rigidly secured to the extension 248 of the arm 244. The segment has a notch 292 cooperating with a notch 294 in the extension 248 for the attachment of a link 296, the purpose of which will hereinafter appear.

As the head 252 is manually lowered into operative position by the handle 256, the segment 290 is moved through an angle until it clears the arm 288. During this movement of the segment 290 the extension 248 of the arm 244 is also moved through an angle to a position beyond the lever 282, whereupon the lever 282 is urged by a spring 298 to engage a stop 300 on the free end of the extension 248 of the arm 244 to effectively lock the head in operative position. During this movement of the lever 282 to lock the head in operative position, the lever is rocked sufficiently to provide for clock-wise movement of the segment 286 so that the shaft 98 may be freely rocked to actuate the operating unit of the buck.

In actuating the operating unit for the buck, force is applied to the lever 102 to rock the shaft 98. This movement of the shaft is transmitted through the thrust pin 94 to the piston 86 resulting in moving this piston on its compression stroke. As the piston moves on its compression stroke fluid is discharged from the cylinder 42, through the passage 48 into the valve chamber, where it is received in the groove 110 in the plug 108, and thence passes through the openings 112 past the collapsible leak-proof cup 114, and from the valve chamber through passage 52, conduits 170 and 172, into the motor cylinders 174 and 176, and through these cylinders and conduits 194 and 196, to the connection 192 having connected thereto the pressure valve 198, through the passage 54 to the compartment 118, resulting in actuating the motor cylinders and thereby raising the buck to engage the head with sufficient pressure to effectively perform the work. When a predetermined pressure is obtained, the fluid pressure switch 198 closes the circuit 200 resulting in lighting the lamp 202, thus indicating that pressure is applied.

Upon release of the applied force, the piston 86 is returned to its retracted position under the influence of the spring 90, whereupon fluid is drawn from the reservoir through the port 44, the circumferential groove 80 and openings 82, past the collapsible leak-proof cup 84 into the cylinder, to fill the cylinder for subsequent operation.

Upon release of the applied force and movement of the operating lever 102 to rock the shaft in counterclock-wise direction, the valve 132 is tripped by the lever 150 to open the port 122, resulting in relieving the pressure in the motor cylinders 174 and 176 and the return of the buck 210 to its normal position. Upon opening the port 122 the fluid is returned from the motor cylinders through the conduits 194 and 196 and passage 54 to the compartment 118 of the valve chamber, and any excess fluid in the system is returned from the valve chamber, through port 122, valve chamber 118 and passage 58, to the reservoir.

Further movement of the shaft is transmitted to the segment 286 resulting in rocking the lever 282 to disengage the lever 282 from the stop 300. As the shaft is rotated counterclock-wise, a lever 302 loosely mounted on the shaft is engaged by a driver 304 on the lever 96, and is moved through an angle.

The lever 302 is attached through a yielding connection 306 including a compression spring 308 to a lever 310 pivoted on the frame 10, and connected to the link 296; hence this movement of the lever 300 compresses the spring 308 resulting in imparting an initial movement to the arm 244 to move the head from operative position to an elevated position, and this movement of the head is augmented by springs 312 connecting the lever 300 to a fixed support.

Although this invention has been described in connection with certain specific embodiments, the principles involved are susceptible of numerous other applications that will readily occur to persons skilled in the art. The invention is, therefore to be limited only as indicated by the scope of the appended claims.

Having thus described the various features of the invention, what I claim as new and desire to secure by Letters Patent is:—

1. An ironing machine comprising a head movable manually into operative position, means for locking the head in operative position, a buck for cooperation with the head, fluid pressure means for actuating the buck, a relief valve for the fluid pressure means, operating means movable in one direction to actuate the fluid pressure means and in another direction to trip the valve and unlock the head, and means actuated thereby for moving the head to inoperative position.

2. An ironing machine comprising a head movable manually into operative position, means for locking the head in operative position, a buck for cooperation with the head, fluid pressure means for moving the buck, a relief valve for the fluid pressure means, means for actuating the fluid pressure means including means for unlocking the locking means and tripping the valve, means effective upon unlocking the locking means for moving the head to inoperative position, and means for assisting the means for moving the head to inoperative position.

3. An ironing machine comprising a head movable manually into operative position, means for locking the head in operative position, means for moving the head to inoperative position, a buck for cooperation with the head, fluid pressure means for actuating the buck, a relief valve for the fluid pressure means, means for actuating the fluid pressure means including means for unlocking the locking means and tripping the valve, and means actuated thereby assisting the means for moving the head to inoperative position.

4. An ironing machine comprising a head moable manually into operative position, means for locking the head in operative position, a buck for cooperation with the head, fluid pressure means for actuating the buck, a relief valve for the fluid pressure means, means for actuating the fluid pressure means including means for unlocking the locking means and tripping the valve, means effective upon unlocking the locking means to move the head to inoperative position including means assisting in the initial movement of the head to inoperative position, and means carried by the actuating means for actuating the means assisting in the initial movement of the head to inoperative position.

5. An ironing machine comprising a head and a buck, an arm pivoted to swing the head into and from operative position, a segment on the arm, a lever adapted to ride on the segment and to lock the arm when the head is in operative position, means for moving the buck for cooperation with the head including means for tripping the lever, and means for moving the head to inoperative position.

6. An ironing machine comprising a head and a buck, an arm pivoted to swing the head into and from operative position, a segment on the arm, a lever adapted to ride on the segment and to lock the head against movement when the head is in operative position, pressure producing means for moving the buck for cooperation with the head, a relief valve for the pressure producing means, actuating means for the pressure producing means including means for tripping the valve and the lever, and means for moving the head to inoperative position.

7. An ironing machine comprising a head and a buck, an arm pivoted to swing the head into and from operative position, a segment on the arm, a spring-actuated lever adapted to ride on the segment and to lock the arm against movement when the head is in operative position, means for moving the head to inoperative position, means for moving the buck for cooperation with the head, and actuating means for the buck including means for tripping the lever and means for imparting the initial movement of the head to inoperative position.

8. An ironing machine comprising a head, an arm pivoted to swing the head into and from operative position, a segment on the arm, a spring-actuated lever adapted to ride on the segment and to lock the arm when the head is in operative position, a buck for cooperation with the head, pressure producing means for actuating the buck including a relief valve, means for actuating the pressure producing means including means for tripping the valve and the lever, and means for moving the head to inoperative position.

9. An ironing machine comprising a head, manual means for moving the head into and from operative position, means for locking the head in operative position including a lever cooperating with an arm supporting the head, a buck for cooperation with the head, fluid pressure means for actuating the buck including a relief valve, means for actuating the fluid pressure means including means for actuating the relief valve, means associated therewith for tripping the lever, and means operated thereby for moving the head to inoperative position.

10. An ironing machine comprising a frame including a hollow column, an arm pivoted to the column having a part extending into the column, a head supported by the arm, manual means for moving the arm to swing the head into and from operative position, a lever pivoted on the frame cooperating with the arm and adapted to lock the arm against movement when the head is in operative position, a buck for cooperation with the head, fluid pressure means for actuating the buck including a relief valve, means for actuating the fluid pressure means including means for actuating the relief valve, and means associated therewith for tripping the lever and actuating the means for moving the head to inoperative position.

11. An ironing machine comprising a pressure producing device including a reservoir, a cylinder communicating therewith, a valve controlling the communication inhibiting flow of fluid from the cylinder to the reservoir, a piston reciprocable in the cylinder, a chamber communicating with the cylinder and the reservoir, a check valve controlling the communication between the cylinder and the chamber inhibiting flow of fluid from the chamber to the cylinder, a relief valve controlling the communication between the chamber and the reservoir, fluid pressure actuated means connected to the chamber intermediate the check and relief valves, a buck connected to the pressure actuated means to be moved thereby, a head cooperating with the buck, and means for actuating the piston and the relief valve.

12. An ironing machine comprising a pressure producing device including a reservoir, a cylinder communicating therewith, a valve controlling the communication inhibiting flow of fluid from the cylinder to the reservoir, a piston reciprocable in the cylinder, a chamber communicating with the cylinder and the reservoir, a check valve in the chamber controlling the communication between the cylinder and the chamber inhibiting flow of fluid from the chamber to the cylinder, a relief valve in the chamber controlling the communication between the chamber and the reservoir, a support, fluid pressure actuated means on the support, means connecting the pressure actuated means to the chamber intermediate the check and relief valves, a buck connected to the pressure actuated means to be moved thereby, a head cooperating with the buck, and means for actuating the piston and the relief valve.

13. An ironing machine comprising a fluid pressure producing device including a reservoir, a cylinder communicating therewith, a valve controlling the communication inhibiting flow of fluid from the cylinder to the reservoir, a piston reciprocable in the cylinder, a chamber communicating with the cylinder and reservoir, a check valve in the chamber controlling the communication between the cylinder and chamber inhibiting flow of fluid from the chamber to the cylinder, a relief valve in the chamber controlling the communication between the chamber and the reservoir, a support on the reservoir, fluid pressure actuated means on the support, means connecting the pressure actuated means to the chamber intermediate the check and relief valves, springs on the support, a buck on the springs, means connecting the pressure actuated means to the buck, a head for cooperation with the buck, and means for actuating the piston and relief valve.

14. An ironing machine comprising a frame, a pressure producing device on the frame including a reservoir, a spring-pressed piston in the reservoir, a cylinder communicating with the reservoir, a valve controlling the communication inhibiting flow of fluid from the cylinder to the reservoir, a piston reciprocable in the cylinder, a chamber communicating with the cylinder and reservoir, a check valve controlling the communication between the cylinder and the chamber inhibiting flow of fluid from the chamber to the cylinder, a relief valve controlling the communication between the chamber and the reservoir, a support on the reservoir, fluid pressure actuated means on the support, means connecting the pressure actuated means to the chamber intermediate the check and relief valves, a buck yieldingly supported on the support and connected to the pressure actuated means to be moved thereby, a head cooperating with the buck, and means for actuating the piston and the relief valve.

15. An ironing machine comprising a fluid reservoir, a cylinder communicating therewith, a valve controlling the communication between the reservoir and the cylinder inhibiting flow of fluid from the cylinder to the reservoir, a piston reciprocable in the cylinder, a chamber communicating with the cylinder and reservoir, a check valve controlling the communication between the cylinder and chamber inhibiting flow of fluid from the chamber to the cylinder, a relief valve controlling the communication between the chamber and the reservoir, a fluid pressure actuated means, outlet and return passages connecting the pressure actuated means to the chamber intermediate the check and relief valves, a member in the chamber between the outlet and return passages providing means for circulation of fluid through the chamber, a buck connected to the pressure actuated means to be moved thereby, a head cooperating with the buck, and means for actuating the piston and the relief valve.

16. An ironing machine comprising a fluid reservoir, a cylinder communicating therewith, a valve controlling the communication inhibiting flow of fluid from the cylinder to the reservoir, a piston reciprocable in the cylinder, a chamber communicating with the cylinder and the reservoir, a check valve controlling the communication between the cylinder and the chamber inhibiting flow of fluid from the chamber to the cylinder, a relief valve controlling the communication between the chamber and the reservoir, a circulatory fluid line having its outlet and return communicating with the chamber intermediate the valves, a member in the chamber between the outlet and return providing means for circulation of the fluid through the chamber, fluid pressure actuated means connected in the fluid line between the outlet and return, a buck connected to the pressure actuated means to be moved thereby, a head for cooperation with the buck, and means for actuating the piston and the relief valve.

17. An ironing machine comprising a pressure producing device including a fluid reservoir, a spring-pressed piston in the reservoir introducing pressure on the fluid in the reservoir, a cylinder communicating with the reservoir, a valve controlling the communication inhibiting flow of fluid from the cylinder to the reservoir, a chamber communicating with the cylinder and reservoir, a check valve controlling the communication between the cylinder and the chamber inhibiting flow of fluid from the chamber to the cylinder, a relief valve controlling the communication between the reservoir and the chamber, a circulatory fluid line having its outlet and return communicating with the chamber intermediate the check and relief valves, means in the chamber separating the outlet and return so as to provide for circulation of the fluid through the chamber, fluid pressure actuated means connected in the circulatory fluid line, a buck connected to the pressure actuated means to be moved thereby, a head for cooperation with the buck, and means for actuating the piston and the relief valve.

18. An ironing machine comprising a pressure producing device including a fluid reservoir, a spring-pressed piston in the reservoir for creating pressure on the fluid in the reservoir, a cylinder communicating with the reservoir, a valve controlling the communication between the cylinder and the reservoir inhibiting flow of fluid from the cylinder to the reservoir, a piston reciprocable in the cylinder, a spring interposed between the piston and the valve for retaining the valve on its seat and for returning the piston to its retracted position, a chamber communicating with the cylinder and the reservoir, a check valve controlling the communication between the chamber and the cylinder inhibiting flow of fluid from the chamber to the cylinder, a relief valve controlling the communication between the chamber and the reservoir, a circulatory fluid line having its outlet and return communicating with the chamber intermediate the check valve and the relief valve, a member in the chamber between the outlet and return of the fluid line providing means for circulating the fluid through the chamber, fluid pressure actuated means connected in the circulatory fluid line, a buck connected to the pressure actuated means to be moved thereby, a head cooperating with the buck, and means for actuating the piston and relief valve successively.

ANDREW O. McCOLLUM.